United States Patent [19]
Engel

[11] Patent Number: 6,058,770
[45] Date of Patent: May 9, 2000

[54] MACHINE FOR MEASURING SIZES OF PARTICLES AND FOR DETERMINING COLOR DIFFERENCES IN A SUBSTANCE

[75] Inventor: Michael H. Engel, Rahway, N.J.

[73] Assignee: Michael Engel Industries, Inc., Belle Mead, N.J.

[21] Appl. No.: 09/170,884

[22] Filed: Oct. 13, 1998

Related U.S. Application Data

[63] Continuation-in-part of application No. 08/943,823, Oct. 6, 1997.

[51] Int. Cl.$^7$ .................................................. G01B 21/08
[52] U.S. Cl. .......................... 73/150 R; 73/7; 73/865.5; 33/501.02
[58] Field of Search ........................ 73/150 R, 7, 865.5; 33/501.2

[56] References Cited

U.S. PATENT DOCUMENTS

| | | | |
|---|---|---|---|
| 3,100,981 | 8/1963 | Engel et al. | 52/262 |
| 4,522,057 | 6/1985 | Kerchiss | 73/150 R |
| 4,580,438 | 4/1986 | Horand | 73/14 |
| 4,984,532 | 1/1991 | Winters | 118/242 |

Primary Examiner—Hezron Williams
Assistant Examiner—Dennis Loo
Attorney, Agent, or Firm—Kenneth Watov; Watov & Kipnes, P.C.

[57] ABSTRACT

A machine is described for performing a draw-down operation in which a carriage for supporting a scraper is mounted on the base so as to travel along it, an electric motor is coupled to the carriage for moving it and a scraper is pivotally mounted on said carriage with a means for pushing the scraper against the top of the base with a selectable force.

14 Claims, 23 Drawing Sheets

MACHINE FOR MEASURING SIZES OF PARTICLES AND FOR DETERMINING COLOR DIFFERENCES IN A SUBSTANCE

RELATED APPLICATION

This Application is a Continuation-In-Part from co-pending Ser. No. 08/943,823 filed on Oct. 6, 1997, for "Machine For Measuring Sizes Of Particles And For Determining Color Differences In A Substance", and having the same inventorship and ownership herewith.

FIELD OF THE INVENTION

The present invention relates generally to apparatus for particle size measurement, and more particularly to apparatus for measuring the size of particles in semifluid materials such as inks and food products, and for determining gradation in color between samples of similar products.

BACKGROUND OF THE INVENTION

The sizes of solid particles in substances such as in ink, chocolate, and peanut butter has been determined by apparatus called a fineness of grind gage, grind gage or grindometer hereafter referred to as a grindometer, that is comprised of a plate having parallel spaced grooves in a planar surface that gradually vary in depth from one end to the other and a scraper. The scraper is placed in contact with the surface of the plate where the grooves are deepest, and a quantity of the substance to be tested sufficient to fill the grooves is deposited across the grooves in front of it. The scraper is then moved along the surface of the plate toward the shallower ends of the grooves. As the scraper moves along the grooves, it forces the substance under test into them until it meets a particle of such size as to project above the surface in which event it carries the particle along so that the groove is not filled with substance.

It has been customary to move the scraper along the grooves by hand so that the angle of the scraper with respect to the surface of the plate, the angle at which the scraper crosses the grooves, the pressure exerted by the scraper on the plate and the speed with which the scraper moves are extremely variable so that reproduceability of test results is difficult to obtain. Whereas the reproduceability can be improved by a given operator trying to hold these performance parameters within as narrow limits as possible, the results may vary from operator-to-operator.

A machine produced by the Johnsy Gage Manufacturing Company provided some improvement. A grindometer of the type described was mounted on a platform that was moved parallel to the grooves by an electric motor, and a scraper was mounted on a pivoted member that could be rotated so as to bring the scraper into contact with the surface of the grindometer. The force between the scraper and the grindometer was determined by the downward force exerted by an operator on the pivoted member or by a spring. The reproduceability of test results attained by such a machine would be adversely affected by the variability in the force with which the scraper is urged against the grindometer and the fact that the angle of the scraper with respect to the surface of the grindometer changes with the thickness of the grindometer employed. Furthermore, there was little assurance that the force exerted by the scraper would be uniform along its length. In addition, the speed at which the gage was moved by the motor was not variable. Furthermore, the platform on which the gage was mounted extended beyond the confines of the machine when the grindometer was in its initial position.

The color and transparency of inks and other liquids are often compared by depositing drops of each at spaced points across the width of a sheet of paper and manually passing a scraper that is in contact with the sheet through the drops and along the length of the paper in a draw-down procedure so as to produce parallel smears. It is sometimes advantageous to have a black line extending across the width of the sheet. It is apparent that reproduceable results are difficult to attain because any slight differences in the pressure between the scraper and the paper for the two drops will cause the respective smears to have critical differences in thickness.

Whether the machine is being used to determine particle sizes or to make a comparison of color or transparency, it is important that the scraper move at a selected speed. Where particle sizes are being determined, it has been found that better results are obtained if the speed is reduced for substances of greater viscosity.

SUMMARY OF THE INVENTION

A machine constructed in accordance with this invention controls the operating parameters so as to attain reproduceable results in detereming the sizes of solid particles in a substance or in making comparisons of color or transparency of liquids.

In accordance with this invention, an elongated base on which a grindometer gage or a pad of paper may be mounted is provided with a vertical carriage that is moved along a side of the base at a selected speed by an electric motor. A horizontal bracket that extends over the base, and is vertically adjustable on the carriage supports a vertically moveable frame to which a scraper holder is pivotally mounted. In one embodiment, springs between the frame and the scraper holder and a gage are provided so that the force of the scraper on a grindometer or a pad of paper resulting from vertical movement of the bracket is indicated. In another embodiment, a movable weight is moved to a calibrated position on a gage rod, and fulcrum means are provided for transferring the desired force from the weight to the scraper on the grindometer or pad of paper.

In one embodiment, the carriage is moved by a belt system and in another by an Acme™ drive shaft.

BRIEF DESCRIPTION OF THE DRAWINGS

Various embodiments of the invention are described in detail below with reference to the drawings in which like items are identified by the same reference designation.

DETAILED DESCRIPTION OF THE INVENTION

Figure 1A:
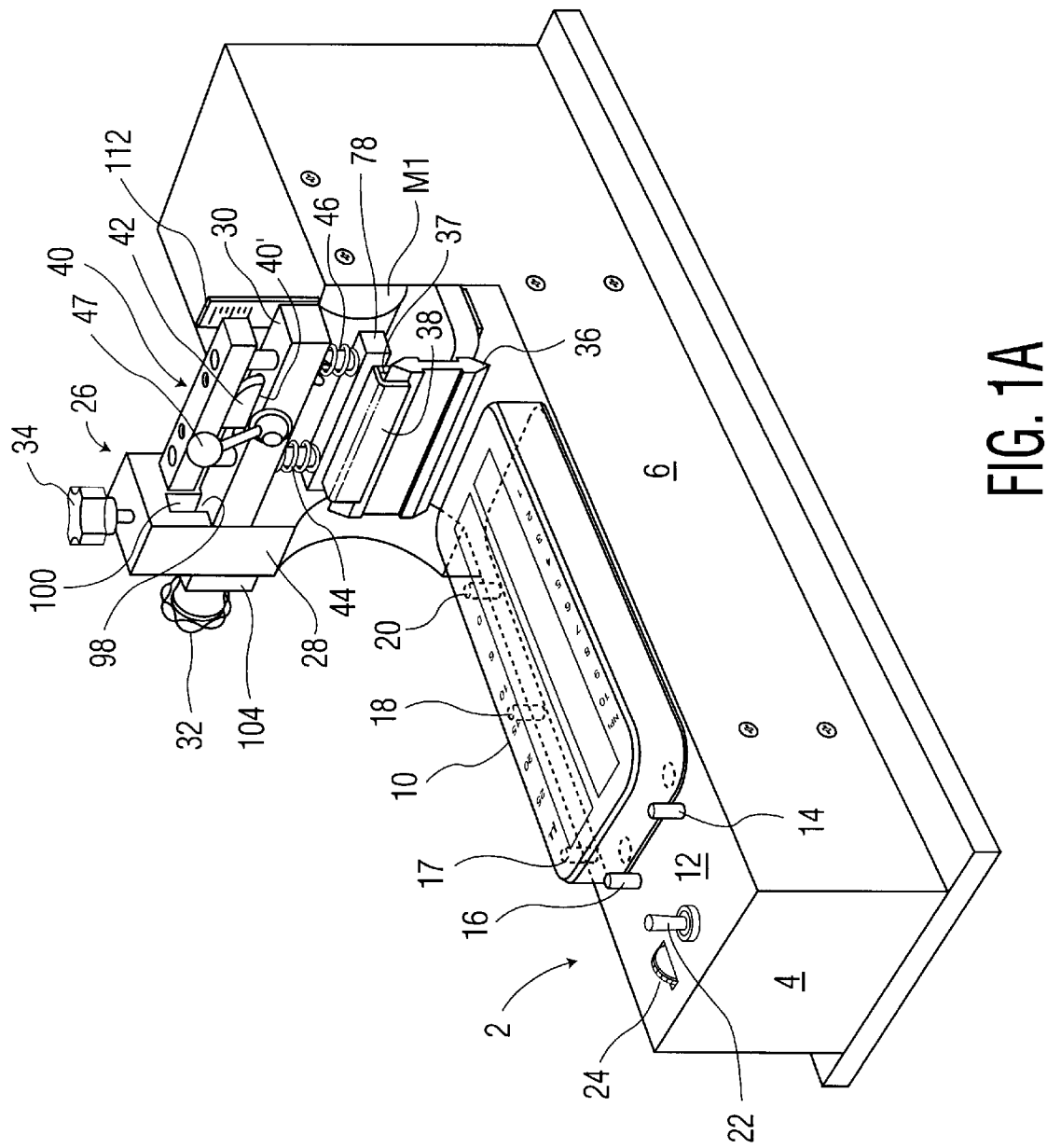
FIG. 1A is an external view of a first embodiment of this invention with enclosure panels in place.

FIG. 1A is an external view of a first embodiment of the invention having a base 2 with enclosure panels 4 and 6 attached so that the inner workings are not visible. In this illustration, a grindometer 10 is positioned on the top 12 of the base 2, by vertical pins 14, 16, 17, 18, and 20. A switch 22 and a speed control 24 for an electric motor M1 are at one end of the top 12 of the base 2.

A carriage 26 has a vertical member 28 on one side of the base 2 and a horizontal bracket 30 extending across the base 2. The bracket 30 is clamped to the vertical member 28 with a knob 32, and its height above the top 12 of the base 2 is adjusted by a knob 34. The vertical member 28 is driven along the base 2 by the motor M1 by means not visible in this view.

A scraper 36 is shown with its top in a recess 37 of a scraper holder 38 that is coupled to the bracket 30 via a holder coupling assembly 40 including a cam 42 and springs 44 and 46 that will be explained in connection with FIG. 3C. The cam 42 protrudes upwardly through a slot 40' in the bracket 30 and is rotated by a handle 47.

Figure 1B:
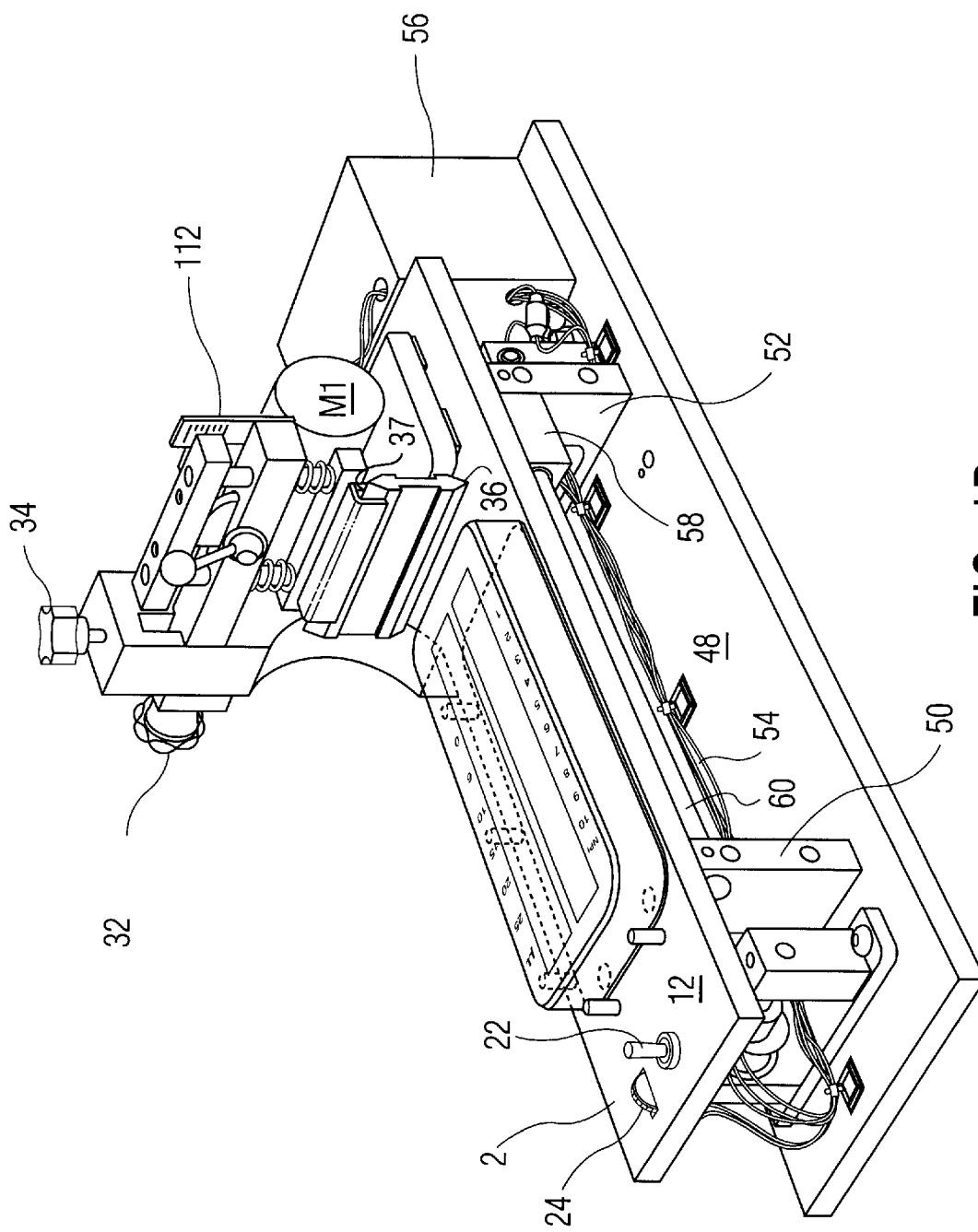
FIG. 1B shows the first embodiment of this invention shown in FIG. 1A with the enclosure panels removed so as to reveal part of the belt drive system for moving the carriage.

FIG. 1B is the same view as FIG. 1A with the enclosure panels 4, 6, and 8 removed so as to show that the top 12 of the base 2 is supported on a bottom 48 by vertical members 50 and 52. Wiring 54 between the switch 22, the speed control 24 and a motor control and D.C. power supply 56 is also shown.

Figure 2:
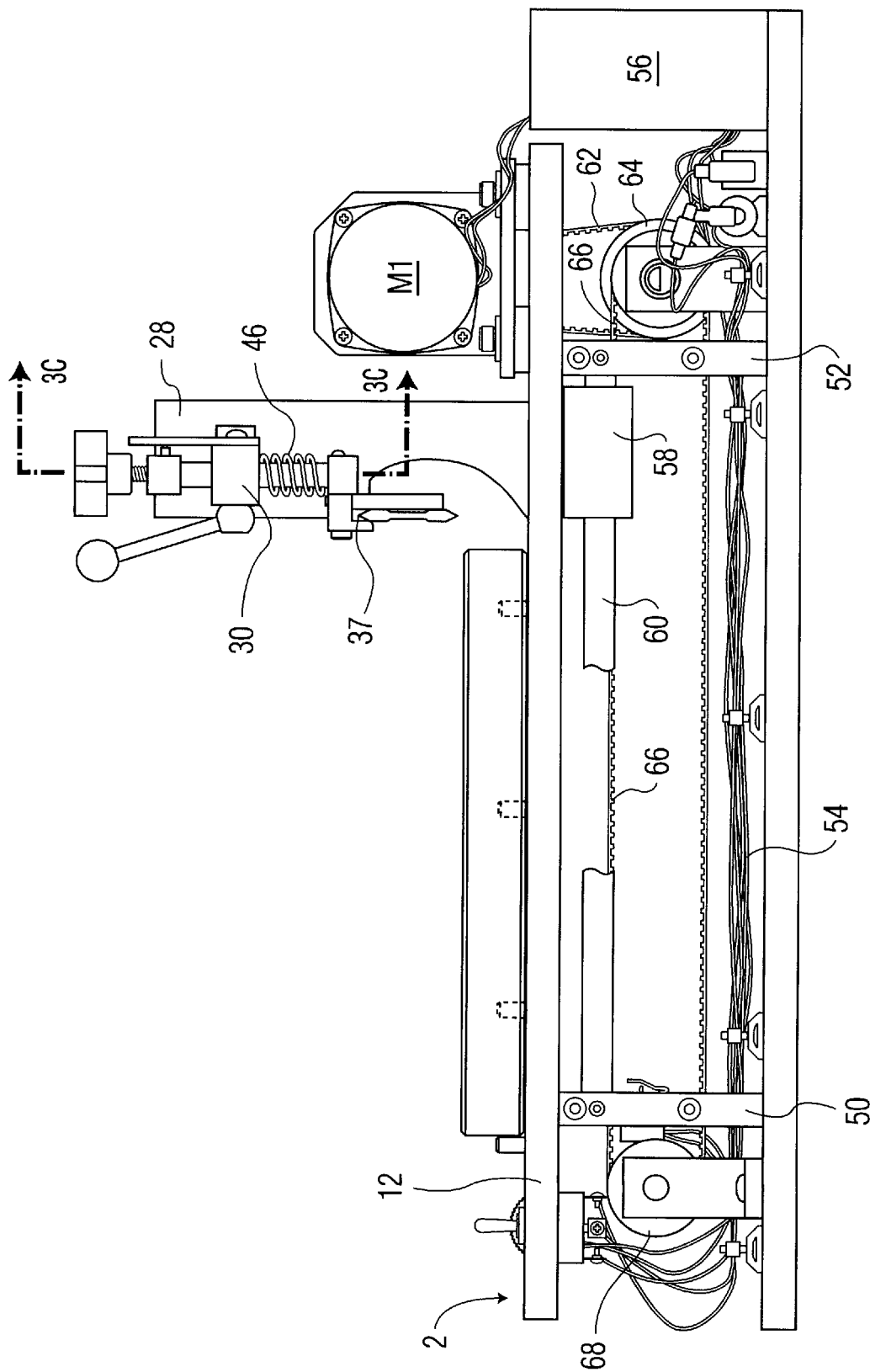
FIG. 2 is a side view of the first embodiment with the enclosure panels removed.
Figure 2A:
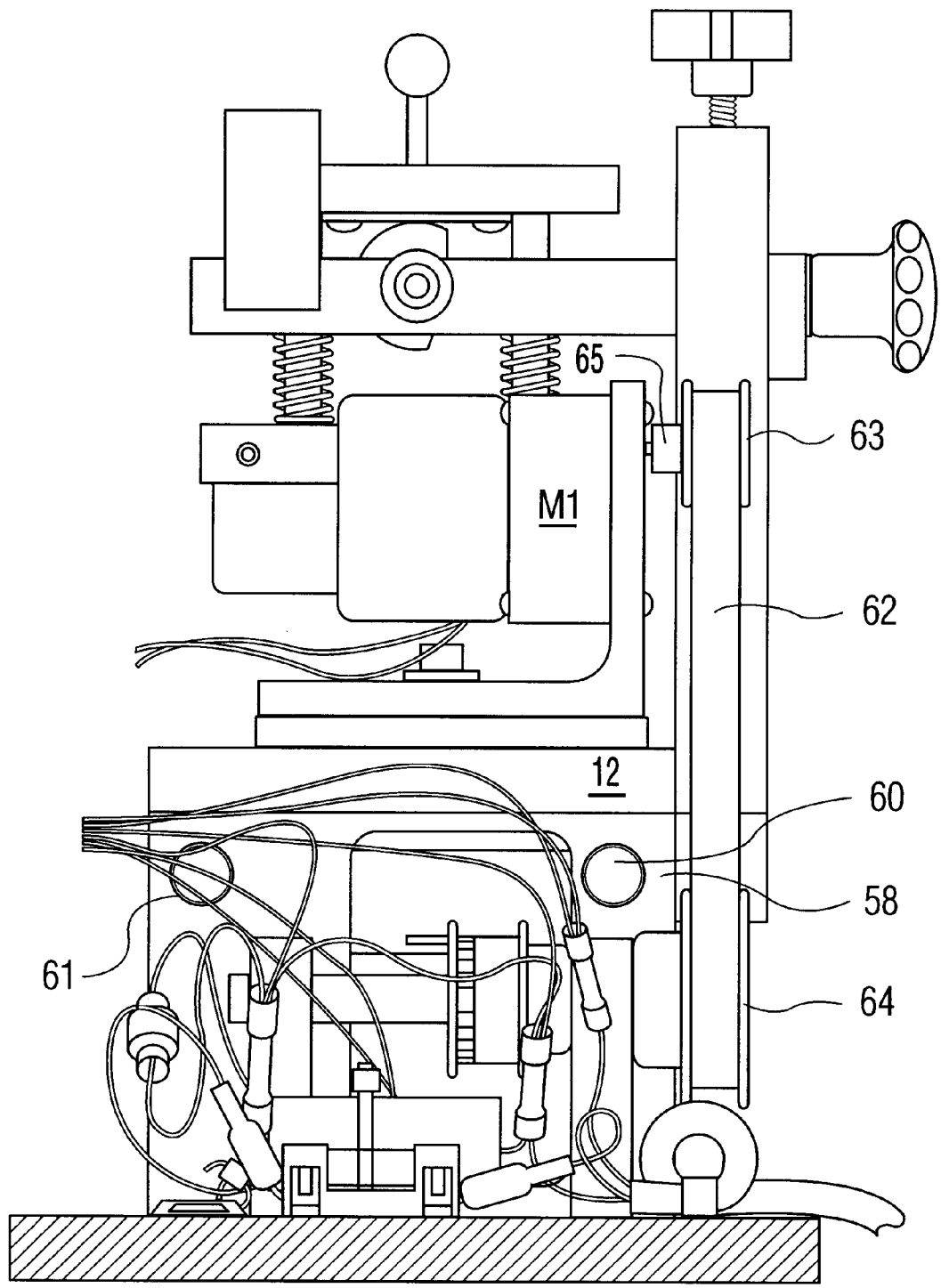
FIG. 2A is a view of one end of the embodiment of FIG. 2.

In the side view of FIG. 2, an end of an horizontal extension 58 that as will be seen is attached to the bottom of the vertical member 28 of the carriage 26 extends under the top 12 of the base 2. A rod 60 is supported by the vertical members 50 and 52 and passes through the horizontal extension 58 with a slide fit. There is a similar rod 61 that is visible in FIG. 2A and parallel to the rod 60. A vertical belt 62 couples the motor M1 to a pulley 64 that is coupled to one end of a horizontal belt 66, the other end passing around a pulley 68. Although not shown, the belt 66 is connected to the horizontal extension 58 of the carriage 26 so as to move the latter along the base 2. In the end view of FIG. 2A, a pulley 63 is shown attached to the shaft 65 of the motor M1 and drives the belt 62 so as to move the carriage 26.

Figure 3A:
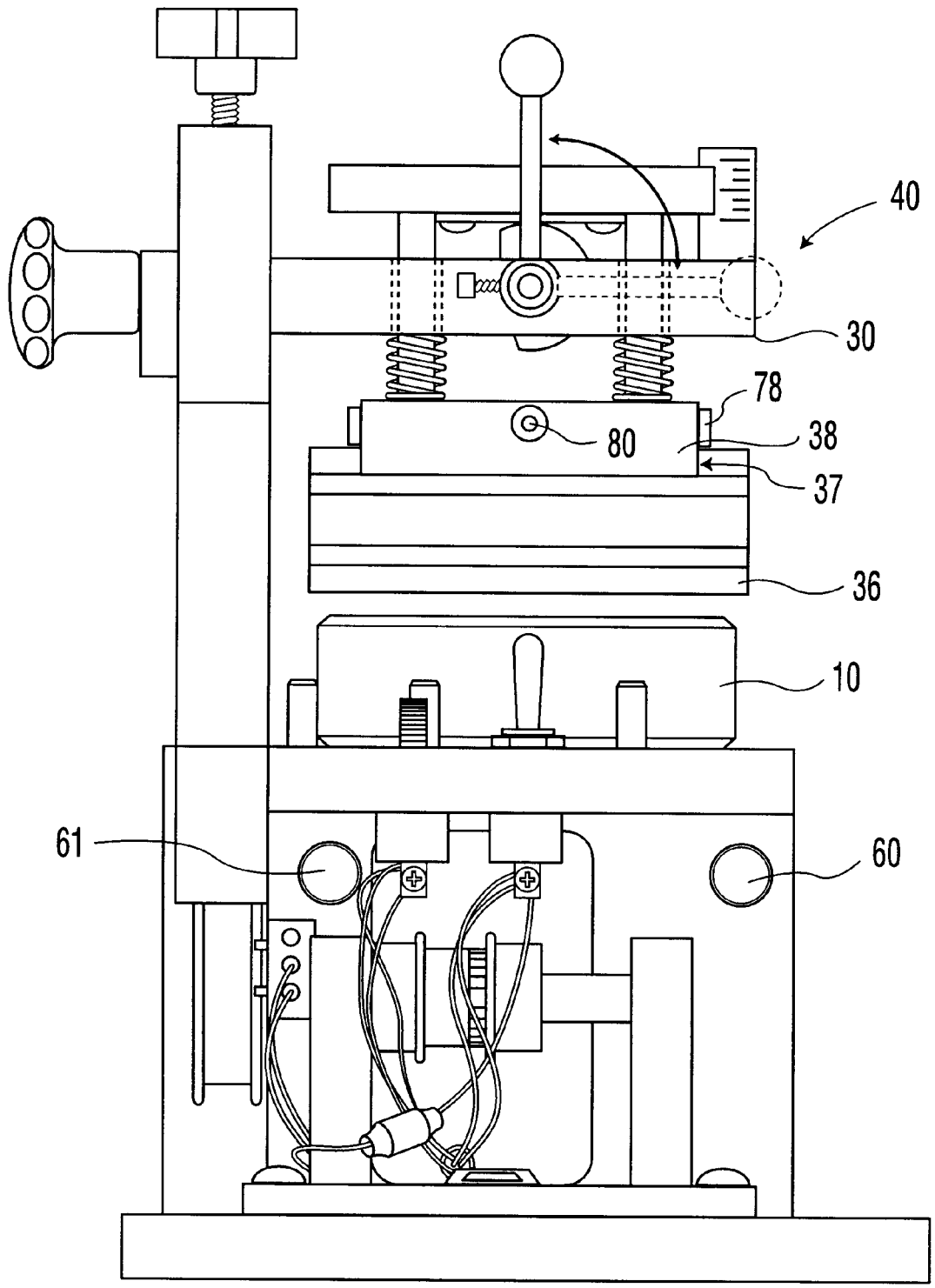
FIG. 3A is a view of the other end of the embodiment of FIG. 2 with the scraper raised.
Figure 3B:
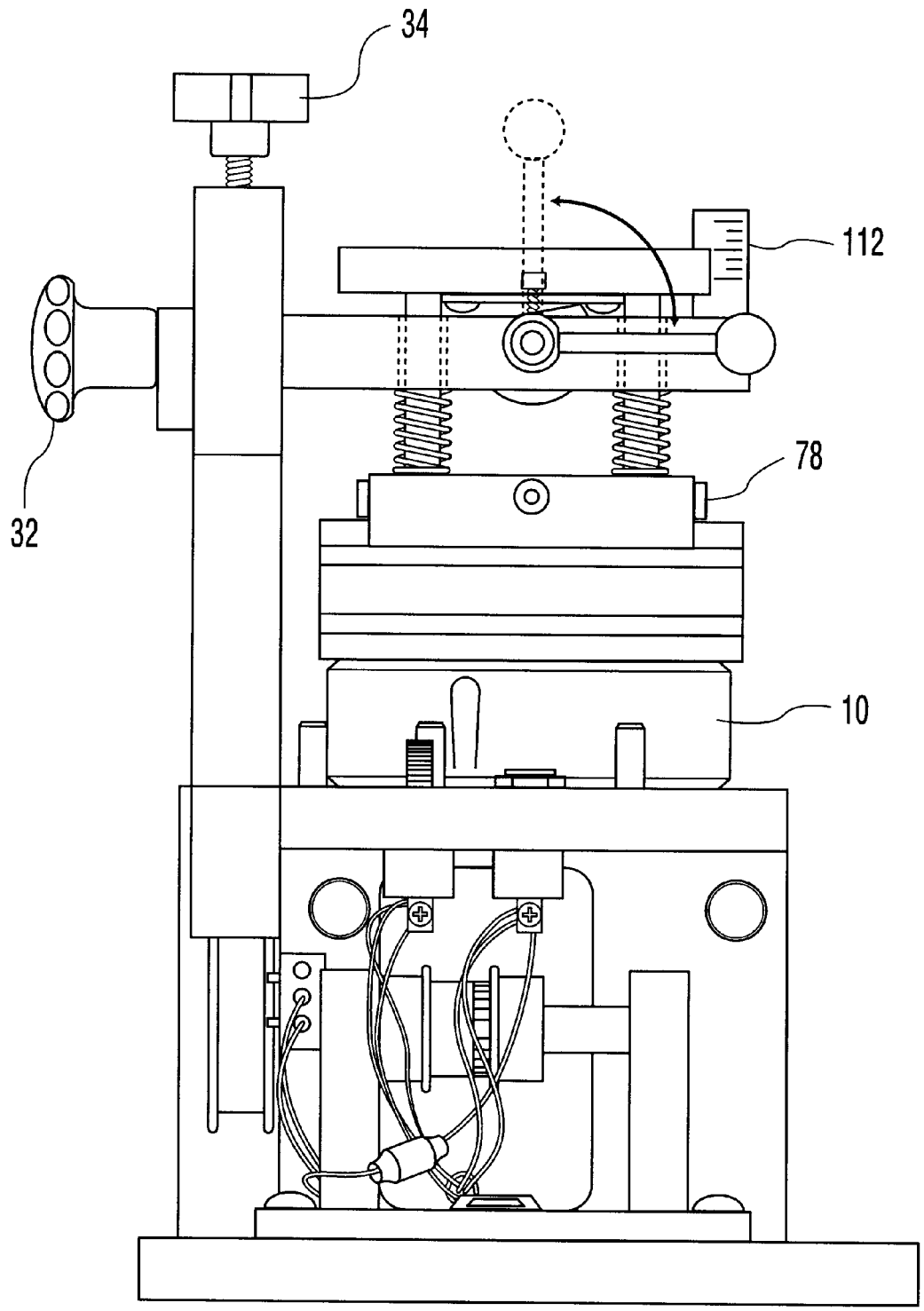
FIG. 3B is a view of the other end of the embodiment of FIG. 2 with the scraper lowered.

Reference is now made to FIGS. 3A, 3B, 3C, and FIG. 4 for a description of the holder assembly 40 by which the scraper 36 is coupled to the bracket 30. The scraper 36 is mounted within the recess 37 in the scraper holder 38 and retained therein by magnets 72, 74, and 76 shown in FIG. 4. The scraper holder 38 is pivotally mounted on a bar 78 at a central point 80 in any suitable manner. The only difference between FIG. 3A and FIG. 3B is that in FIG. 3A, the scraper 36 is shown spaced from the grindometer 10, and in FIG. 3B, the scraper 36 is in contact with the grindometer 10.

Figure 3C:
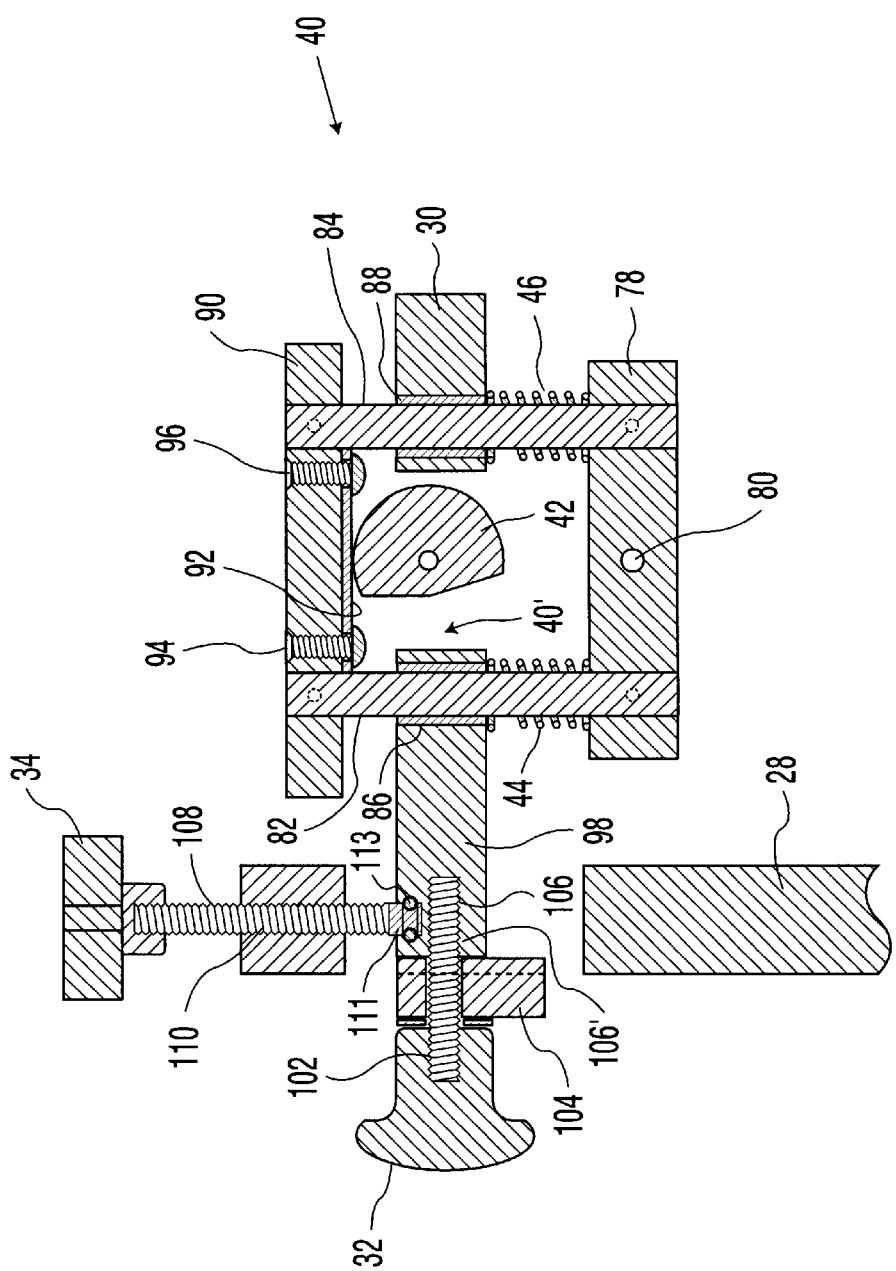
FIG. 3C illustrates a mechanism for raising and lowering a carriage, for attaching the bracket to the carriage and a mechanism for adjusting the force exerted by a scraper.
Figure 4:
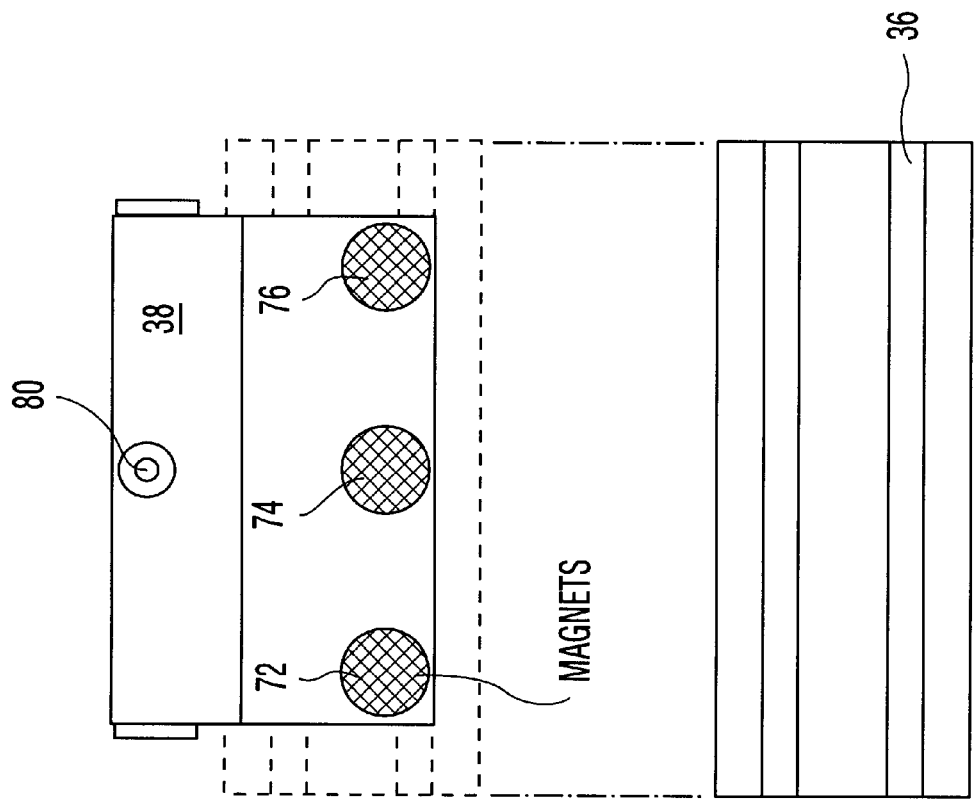
FIG. 4 illustrates a scraper holding assembly having magnets.

As shown in FIG. 3C, the bottom ends of parallel spaced vertical rods 82 and 84 are firmly affixed in the bar 78 and pass through bearings 86 and 88 in the bracket 30 on opposite sides of the slot 40'. The other ends of the rods 82 and 84 are firmly affixed in a bar 90, and the compression springs 44 and 46 of FIG. 1A are respectively coaxial with the rods 82 and 84 and extend between the lower bar 78 and the bracket 30. As shown in FIGS. 1A and 1B, the cam 42 lies within the slot 40' and is shaped so as to bear against a Teflon™ wear plate 92 when the handle 47 is rotated to a given position. The wear plate 92 is fastened to the bar 90 with screws 94 and 96.

As can be seen in FIG. 1A, the farther end 98 of the bracket 30 is narrower than its body and extends through a slot 100 in the vertical member 28 of the carriage 26. In FIG. 3C one end of a threaded member 102 is embedded in the knob 32, and, after passing through a plate 104 that presses against the vertical member 28, the other end 106 of the member 102 is threadedly engaged with a threaded hole 106' so as to clamp the bracket 30 to the vertical member 28.

The bracket 30 and all of the components attached to it are moved up and down by the knob 34 which is attached to one end of a threaded member 108 that is in threaded engagement with a hole 110 in the vertical member 28. Note that the end 111 of the threaded member 108 is formed to fit into a recess 113 in the narrow end 98 of bracket 30.

In using a grindometer, it is extremely important that the force exerted by the scraper 36 on the grindometer 10 be constant, and in order to obtain best results when testing different substances, it is highly advantageous to be able to vary this force. In general, the greater the viscosity of the substance, the greater is the force required. The assembly of FIG. 3C obtains these objectives as follows.

In the inoperative position, the cam 42 is positioned by operation of handle 47 to raise bars 90 and 78 along with scraper 36 away from grindometer 10, causing compression of springs 44 and 46. To adjust the force of scraper 36 against the grindometer 10, handle 47 is operated to release cam 42 from contact with wear plate 92 (see FIG. 3C), decompressing springs 44 and 46. Knob 32 is loosened to permit assembly 40 to be lowered to cause scraper 36 to rest on the grindometer 10. Next, knob 34 is turned to lower bracket 30 and compress springs 44 and 46 by a desired amount as measured against a graduated gage 112 (see FIG. 3B). Knob 32 is then tightened. The scraper 36 may be raised by turning the handle 47 counterclockwise (see FIG. 3A), in this example, to permit another sample of substance to be analyzed.

Figure 5:
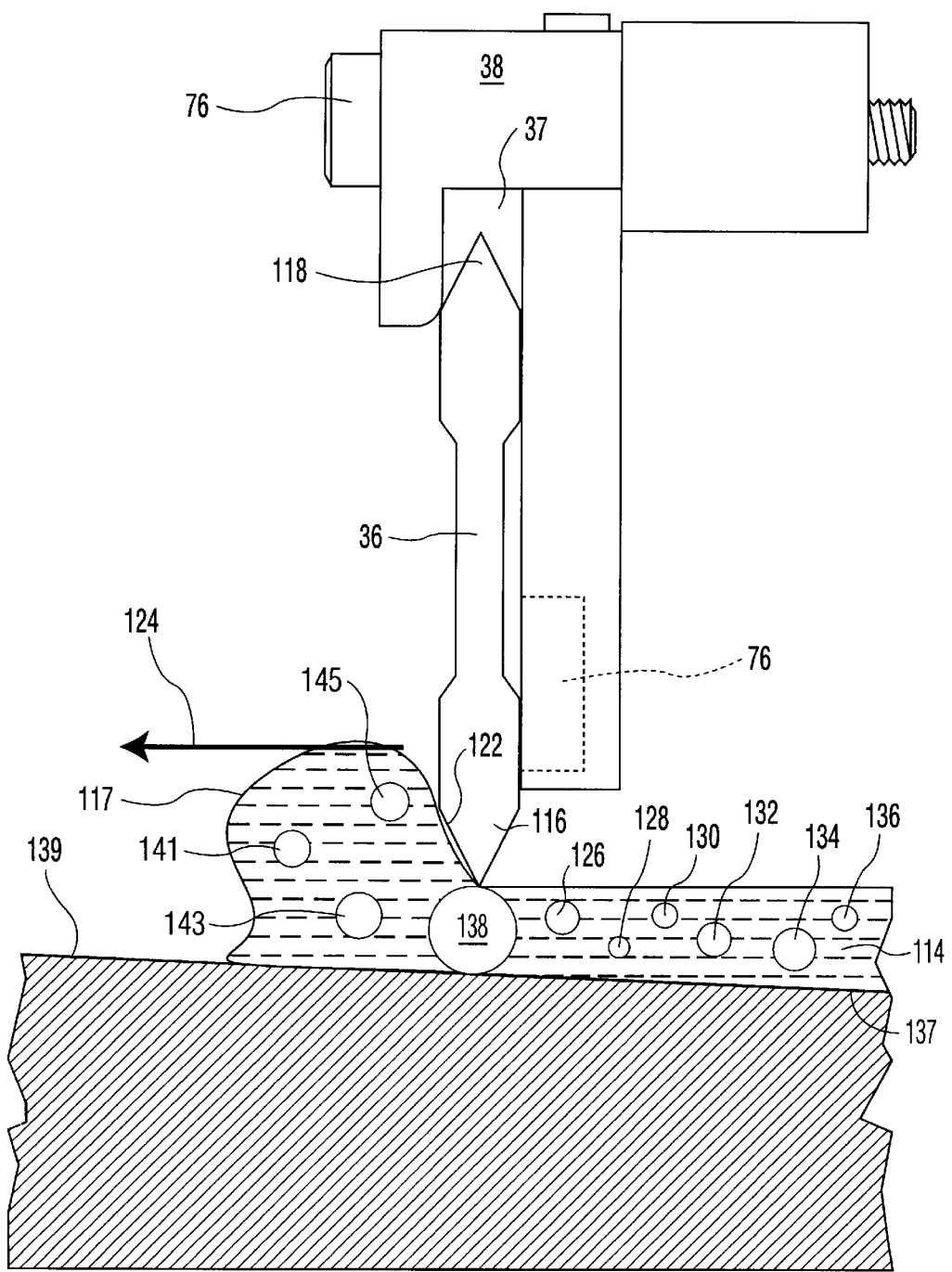
FIG. 5 is a side view of a groove in a grindometer illustrating its operation.
Figure 6:
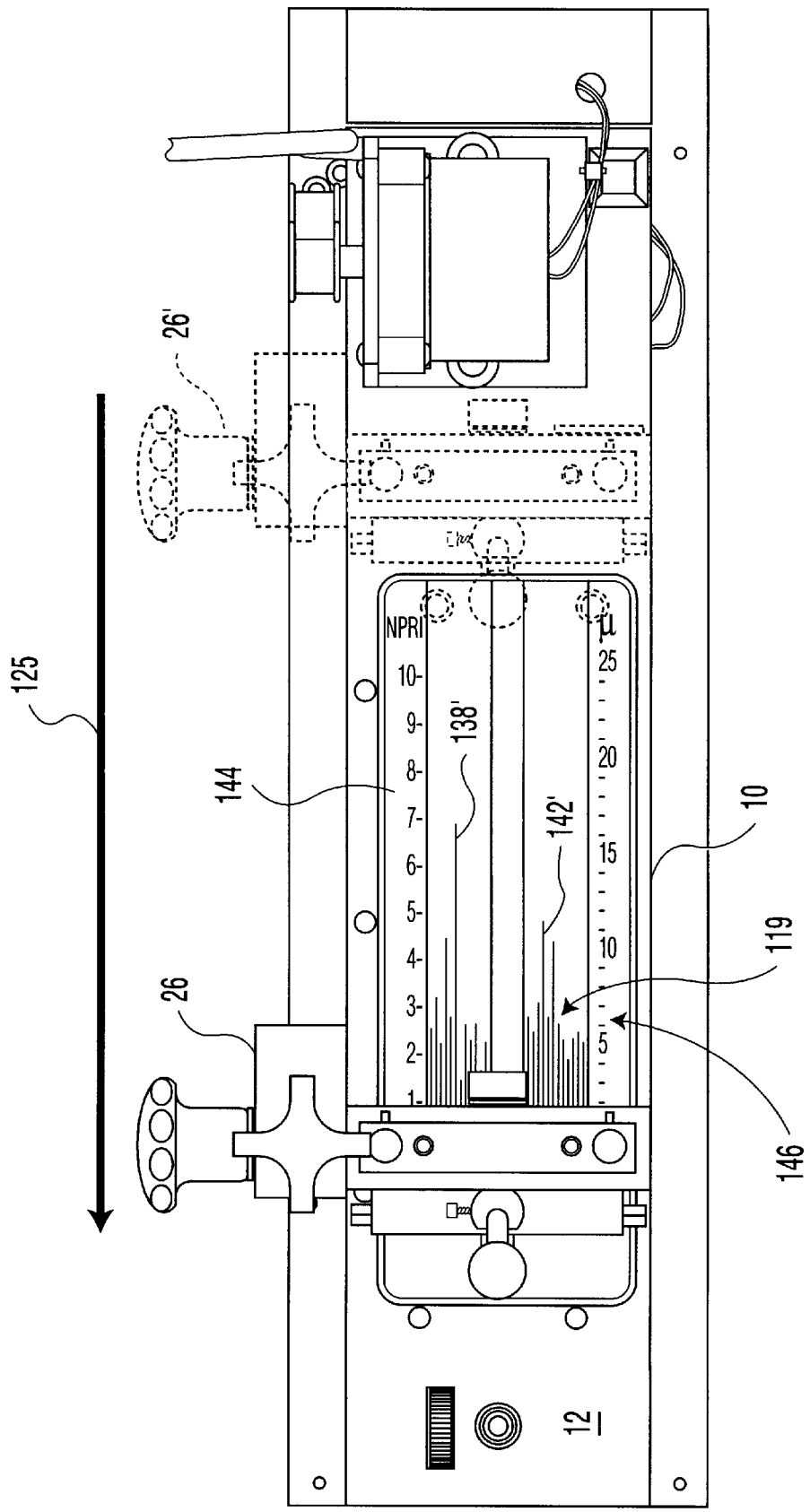
FIG. 6 is a top view of the first embodiment of this invention illustrating the scrapes left in the grooves of a grindometer after the scraper has passed from the deep end of the grooves to their shallower ends.

The operation of the grindometer 10 is now explained by reference to FIGS. 5 and 6. FIG. 5 is a longitudinal cross-section of a groove 114, and FIG. 6 is a top view of the machine looking down on the grindometer 10. Also shown in FIG. 5, are details of the manner in which the scraper 36 is retained in the scraper holder 38. The scraper 36 is herein shown as having two opposing blades 116 and 118. The blade 118 extends into the recess 37 in the scraper holder 38 and is held there by the magnets 72, 74, and 76, but only the magnet 76 is visible in this view.

Initially, the bracket 30 is raised and the carriage 26 is moved to the position 26' shown in dashed lines in FIG. 6 at which the blade 116 is at the deeper end of grooves 119 in the grindometer 10 including, of course, the groove 114 shown in FIG. 5. Then a quantity 117 of the substance under test sufficient to fill the grooves 119 is distributed across the grooves so as to be adjacent a side 122 of the scraper blade 116. The carriage 26 is then moved by operation of the motor M1 toward the shallow ends of the grooves as indicated by arrow 124 in FIG. 5 and arrow 125 in FIG. 6. As the blade 116 moves along, the substance under test including solid particles such as 126, 128, 130, 132, 134, and 136 fills the groove 114, but when the scraper 116 meets a particle like 138 of such size as to extend from the bottom 137 of the groove 114 to a point above the surface 139 in which the groove 114 is formed, the particle becomes jammed between the groove 114 and the blade 116 so as to carry the particle 138 along and thereby prevent the groove 114 from being filled with substance. Particles 141, 143 and 145 may be in the quantity 117 ahead of the side 122 of the blade 116.

The length of the grooves that are not filled in are referred to as scrape marks, and the sizes of particles are determined by the readings on a scale 144 where the scrape marks begin. These are shown in FIG. 6 in which a particle of the size of the particle 138 may initiate a scrape mark 138' so that its size is seven NPIRI (National Printing Ink Research Institute)where each NPIRI measure is one-ten thousandths of an inch (0.0001 inch). A scale 146 on the opposite side of the grindometer 10 from the scale 144 may indicate microns.

Figure 7:
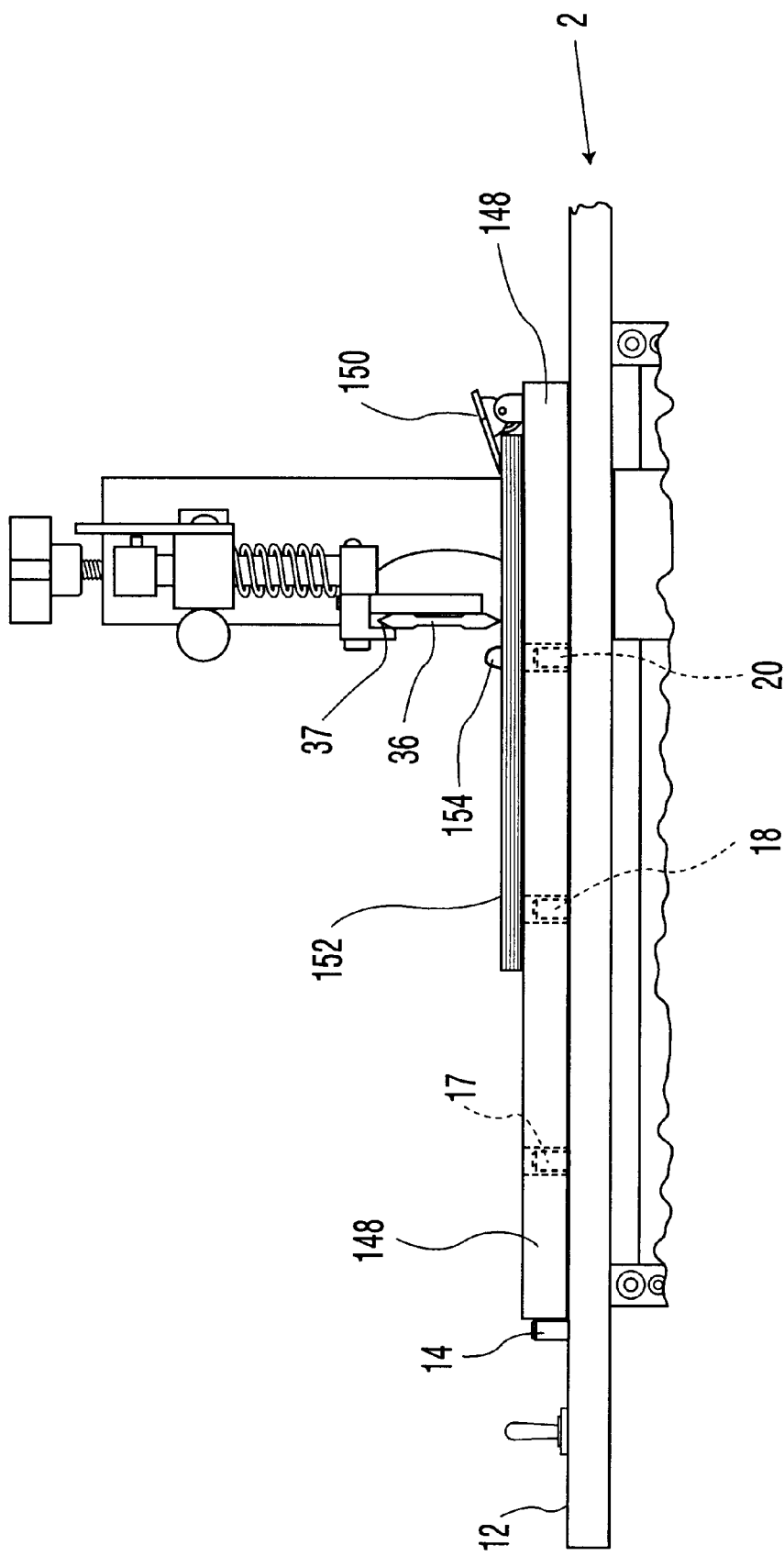
FIG. 7 is a side view of a portion of a machine of this invention when a pad of paper is used.
Figure 8:
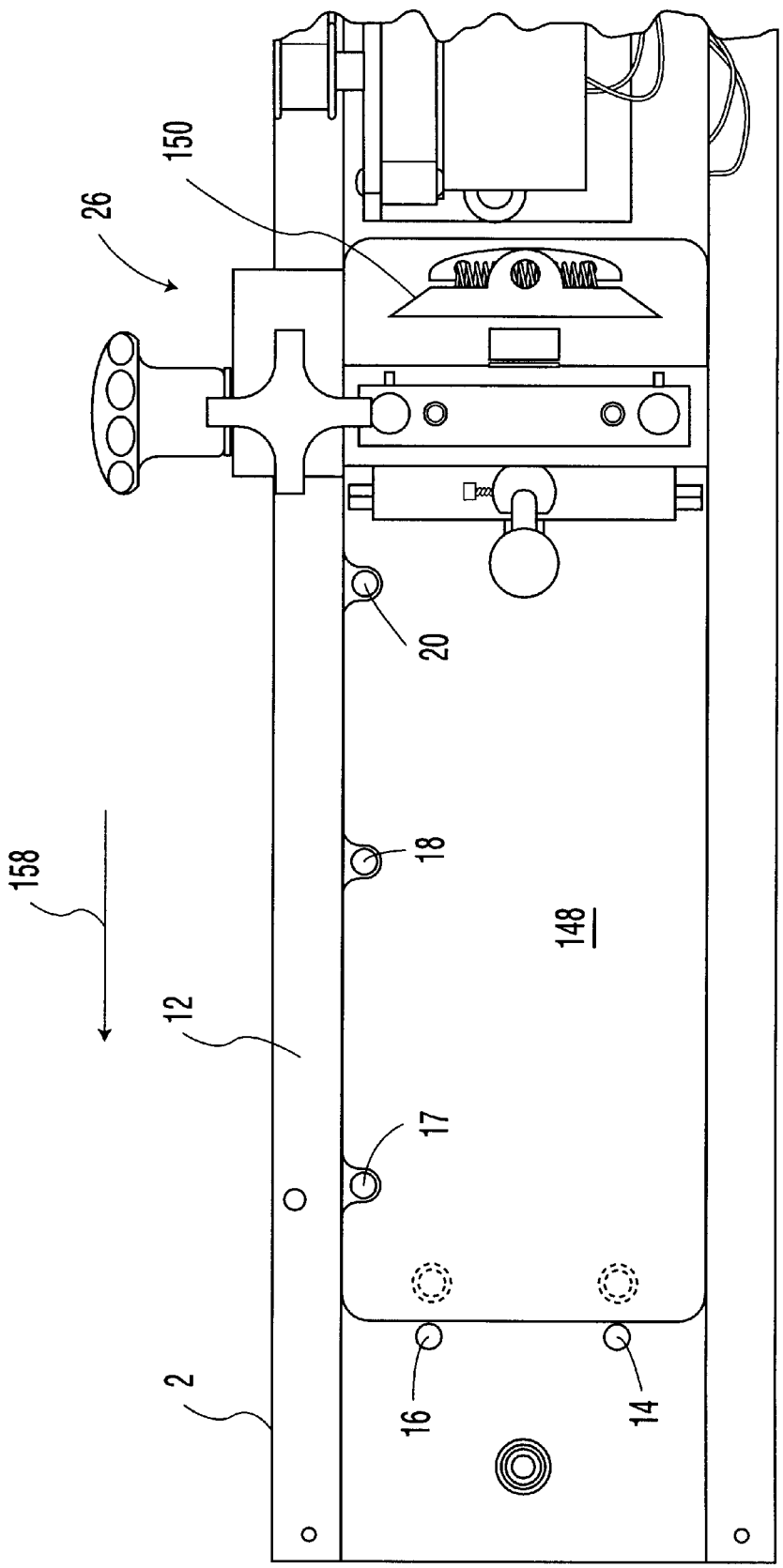
FIG. 8 illustrates the starting position of the machine of this invention when it is being used with a pad of paper for color or transparency comparison of liquids.
Figure 9:
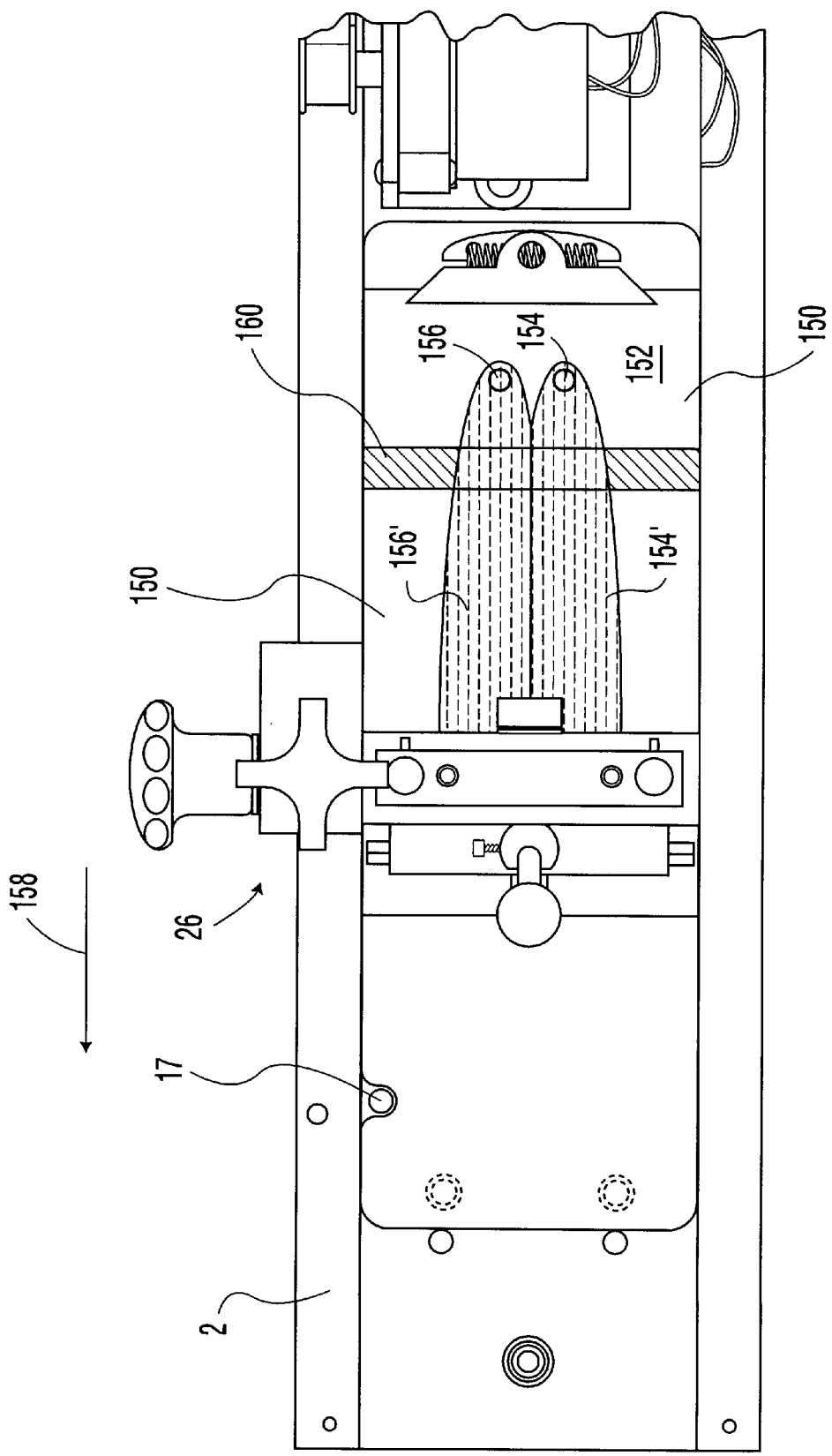
FIG. 9 illustrates the ending position of the machine of this invention when it is being used with a pad of paper so as to illustrate the smears of the different liquids.

As illustrated in FIGS. 7, 8, and 9, the machine of this invention can also be used to compare the color or transparency of liquids. In order to perform these functions, a plate 148 is placed on the top 12 of the base 2 against the pins 14, 16, 17, 18, and 20 just as in the case of the grindometer 10 in FIGS. 1A and 1B, but the pin 16 is not visible in FIG. 7. A spring clip 150 is mounted at the end of the plate 148 so as to hold the end of a pad 152 of paper (FIG. 7). FIG. 8 is a top view of the machine without the pad of paper 152 in the position just described.

In operation, drops 154 and 156 of each liquid under test are placed on the pad 152 just ahead of a scraper 36 as indicated in FIG. 9. Only drop 154 is visible in FIG. 7. After the blade 116 has been lowered onto the pad 152 so as to provide a desired force against it as described in connection with FIG. 3C, the carriage 26 is moved along the base 2 in the direction of an arrow 158. As shown in FIG. 9, the drop 154 forms a smear 154' and the drop 156 forms a smear 156' which can be compared. In some cases, a black band 160 is printed across the paper.

Reference is now made to FIGS. 10 through 14 for a description of a second embodiment of the invention in which the carriage 26 is moved along the base 2 by a motor driven Acme™ drive shaft 160. As seen in the side view of FIG. 10, the drive shaft 160 is mounted for axial revolution between the vertical supports 50 and 52 and extends through an horizontal extension 58' of the carriage 26 that extends under the top 12 of the base 2. The extension 58' differs from the extension 58 of FIG. 3A in that the rods 60 and 61 that support the carriage 26 are near its bottom rather than its top, and provision is made for the drive shaft 160 to pass through it. The drive shaft 160 is turned at a uniform rate by a motor M2. This second embodiment of the invention is preferably used to test highly viscous substances where the motion of the scraper is preferably very slow.

Figure 10:
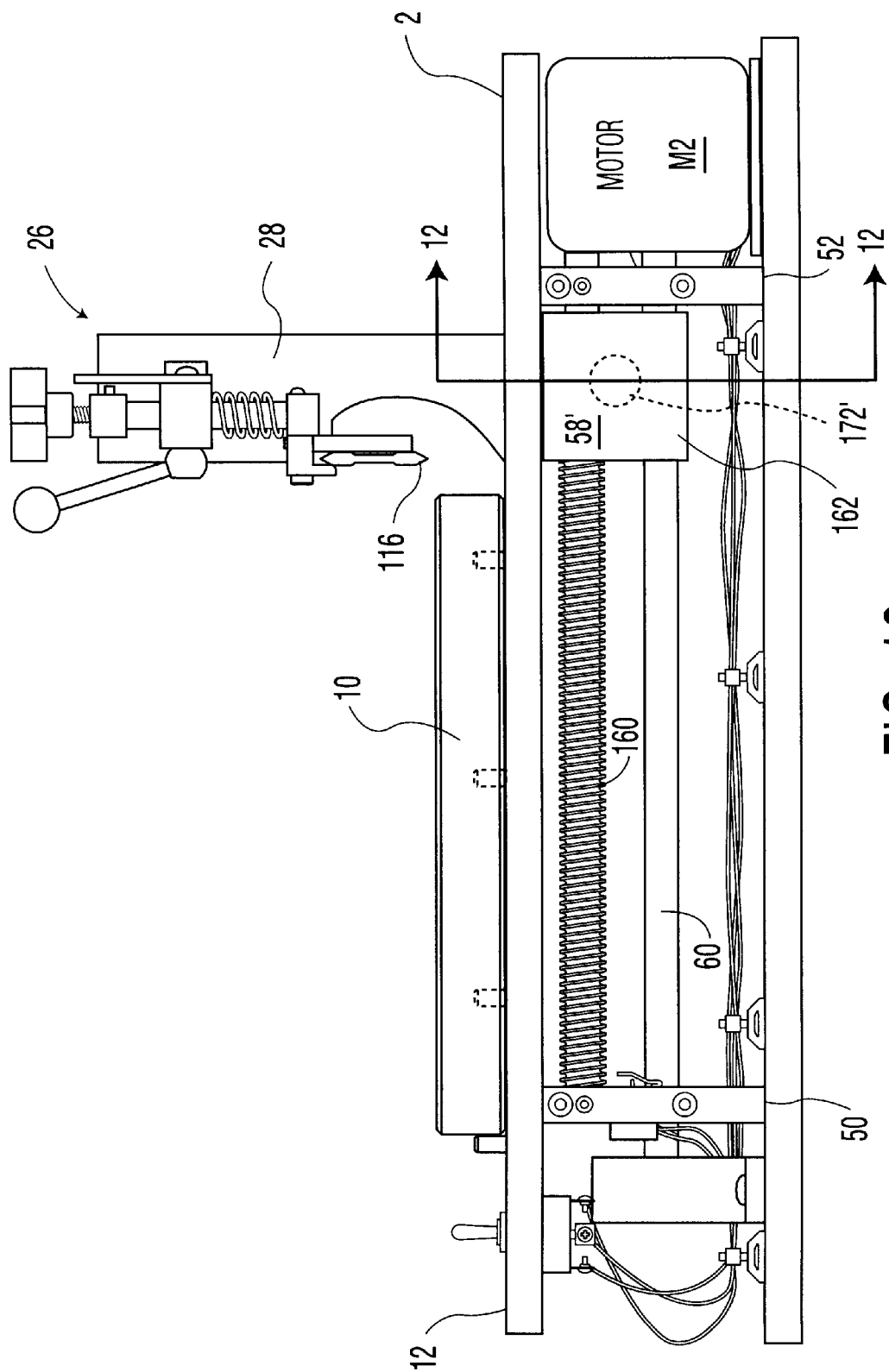
FIG. 10 is a side view of a second embodiment of this invention with the enclosure panels removed so as to illustrate the use of an Acme™ drive shaft for moving the carriage.
Figure 11:
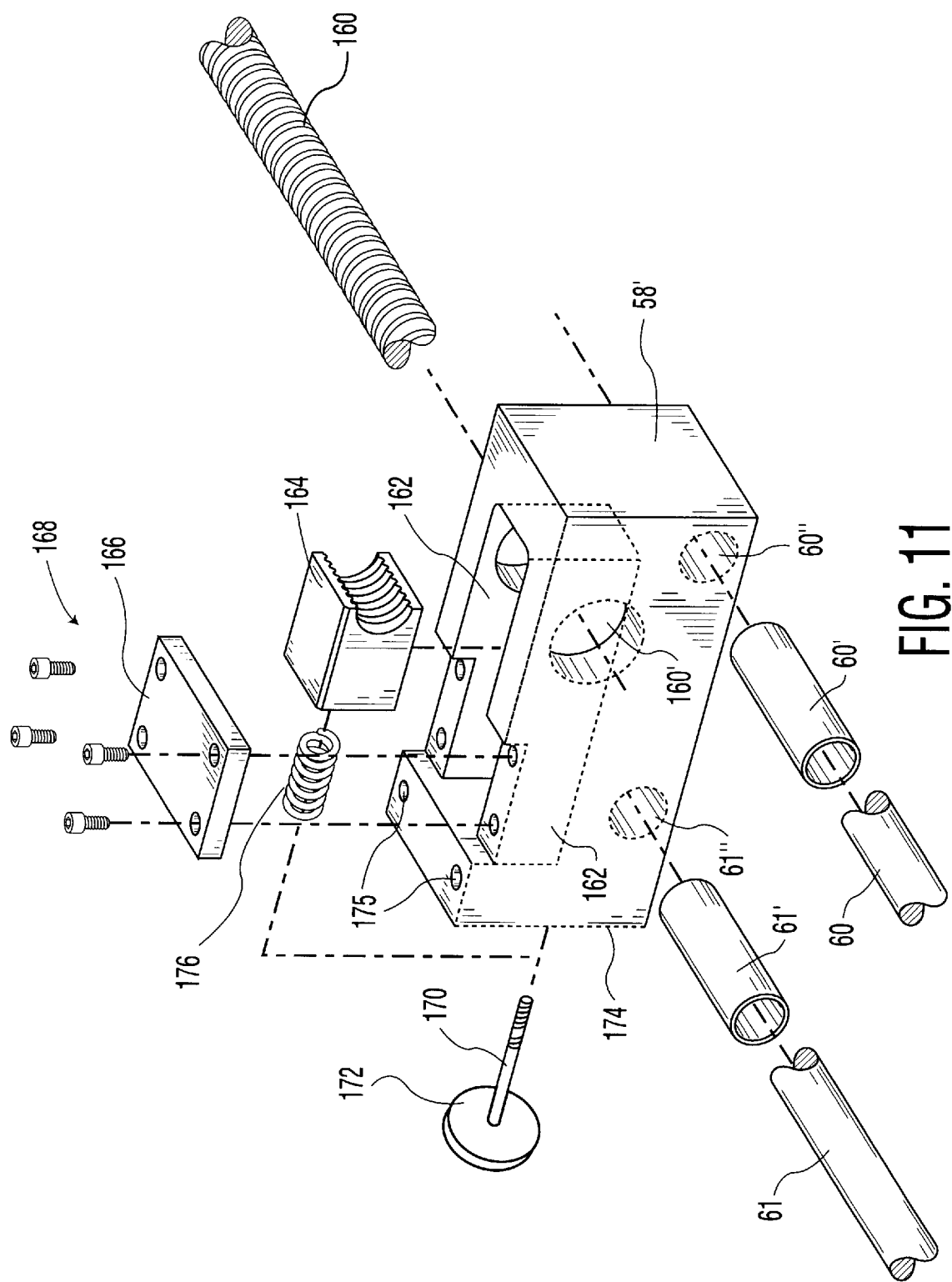
FIG. 11 is an exploded view of a portion of the drive system of FIG. 10 showing a manually operated drive engagement mechanism illustrated in FIGS. 12 and 13.
Figure 12:
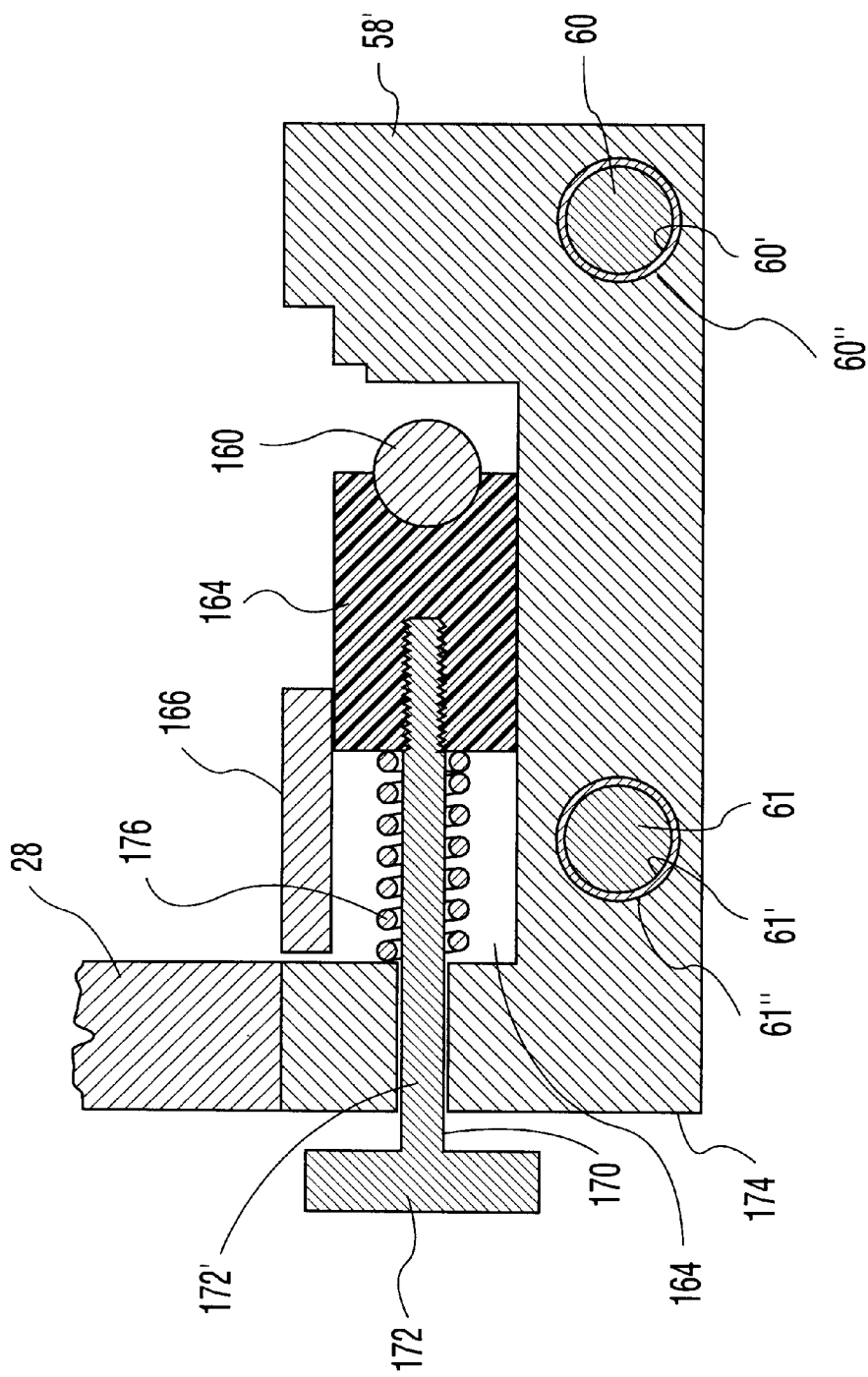
FIG. 12 shows a cross-section of the clutch mechanism of FIG. 11.

FIG. 11 is an exploded view of a drive engagement mechanism in the horizontal extension 58' that couples the drive shaft 160 to the carriage 26, and FIG. 12 is a cross-section 12, of FIG. 10. The rods 60 and 61 respectively pass through nylon™ sleeves 60' and 61' that are mounted within cylindrical apertures 60" and 61" near the bottom of the horizontal extension 58' so as to reduce friction, and the drive shaft 160 passes through a hole 160'. A trough 162 is formed within the horizontal extension 58' through which the shaft 160 passes, and a half Acme™ nut 164 rests on the bottom of the trough 162 as shown in FIG. 12. It is retained therein by a plate 166 that is secured to the extension 58' by screws 168, FIG. 11.

As best viewed in FIG. 12, a shaft 170 of a knob 172 passes through an aperture 172' in a side wall 174 of the extension 58' and is threaded into the nut 164. A compression spring 176 is mounted so as to be coaxial with the shaft 170 and between the nut 164 and the side wall 174 of the extension 58'. The knob 172 is not visible in FIG. 10 because it is on the far side, but its location indicated by a dashed circle 172'. The carriage 26 can be disengaged from the drive shaft 160 by simply pulling on the knob 172.

Figure 13:
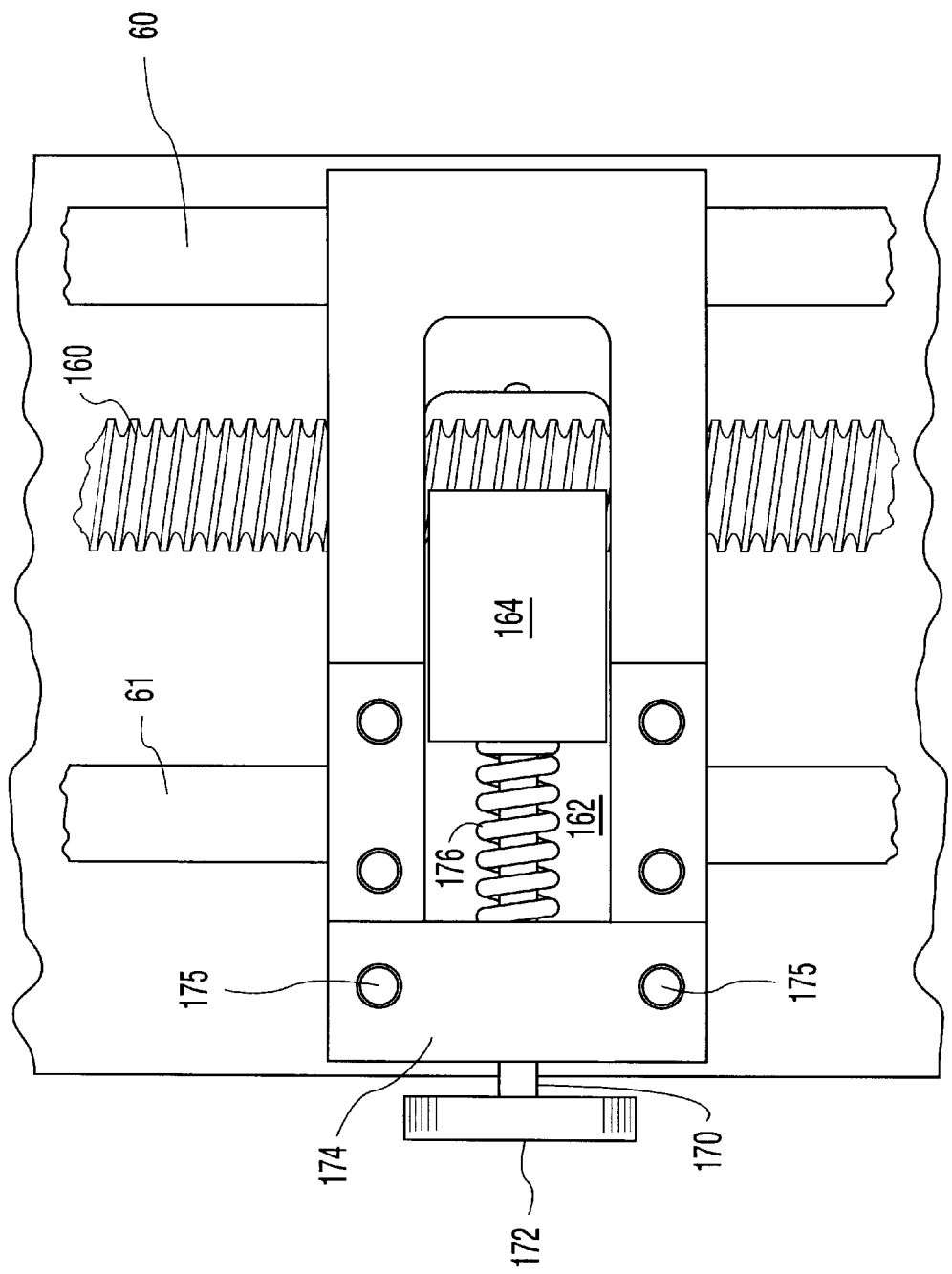
FIG. 13 is a top view of the clutch mechanism of FIG. 11.

FIG. 13 is a top view of the drive engagement mechanism just described with the plate 166 removed. The extension 58' of the carriage 26 is attached to its vertical portion 28 by bolts, not shown, in holes 175.

Figure 14:
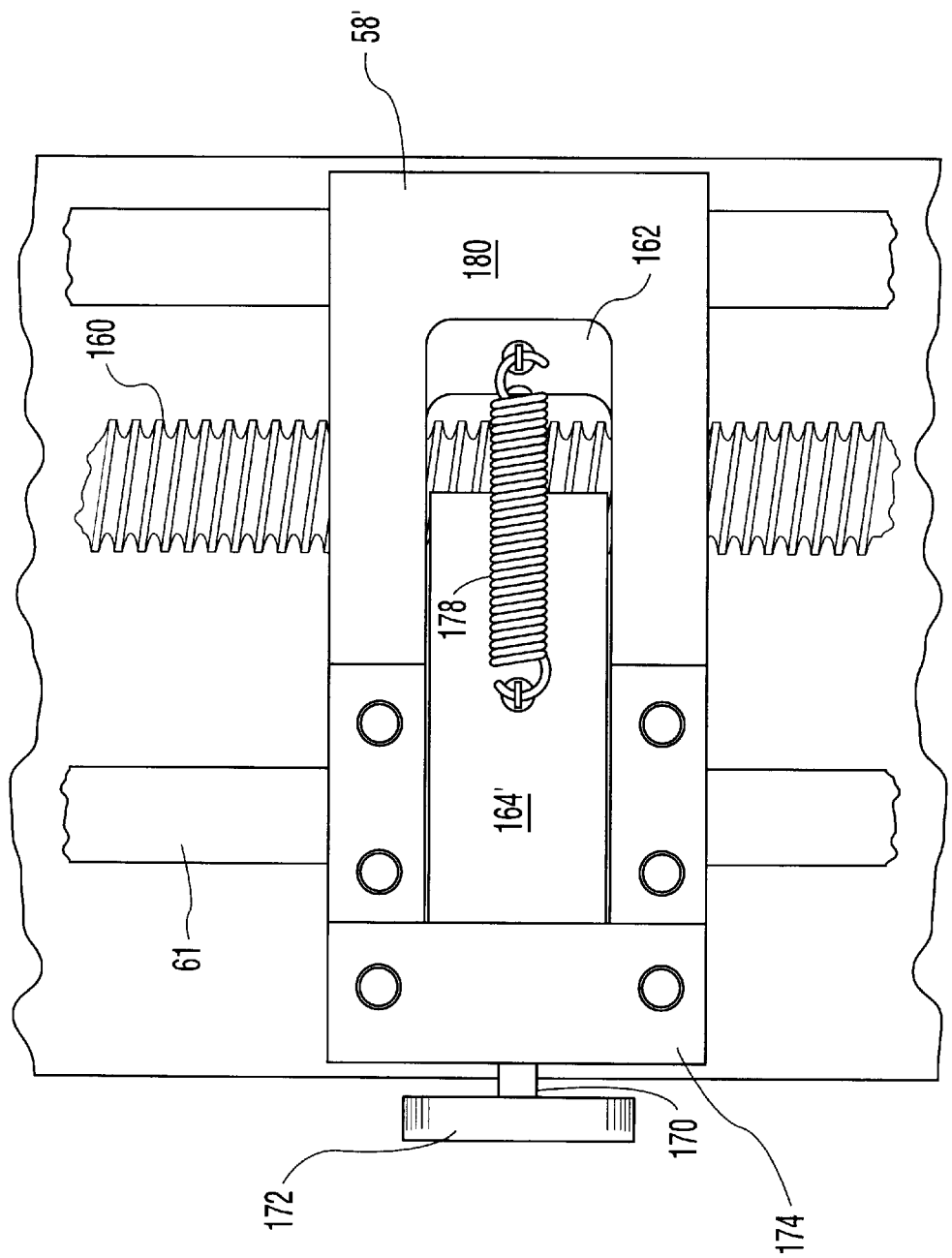
FIG. 14 is the top view of a different clutch mechanism for use with the acme drive system of FIG. 10.
Figure 15:
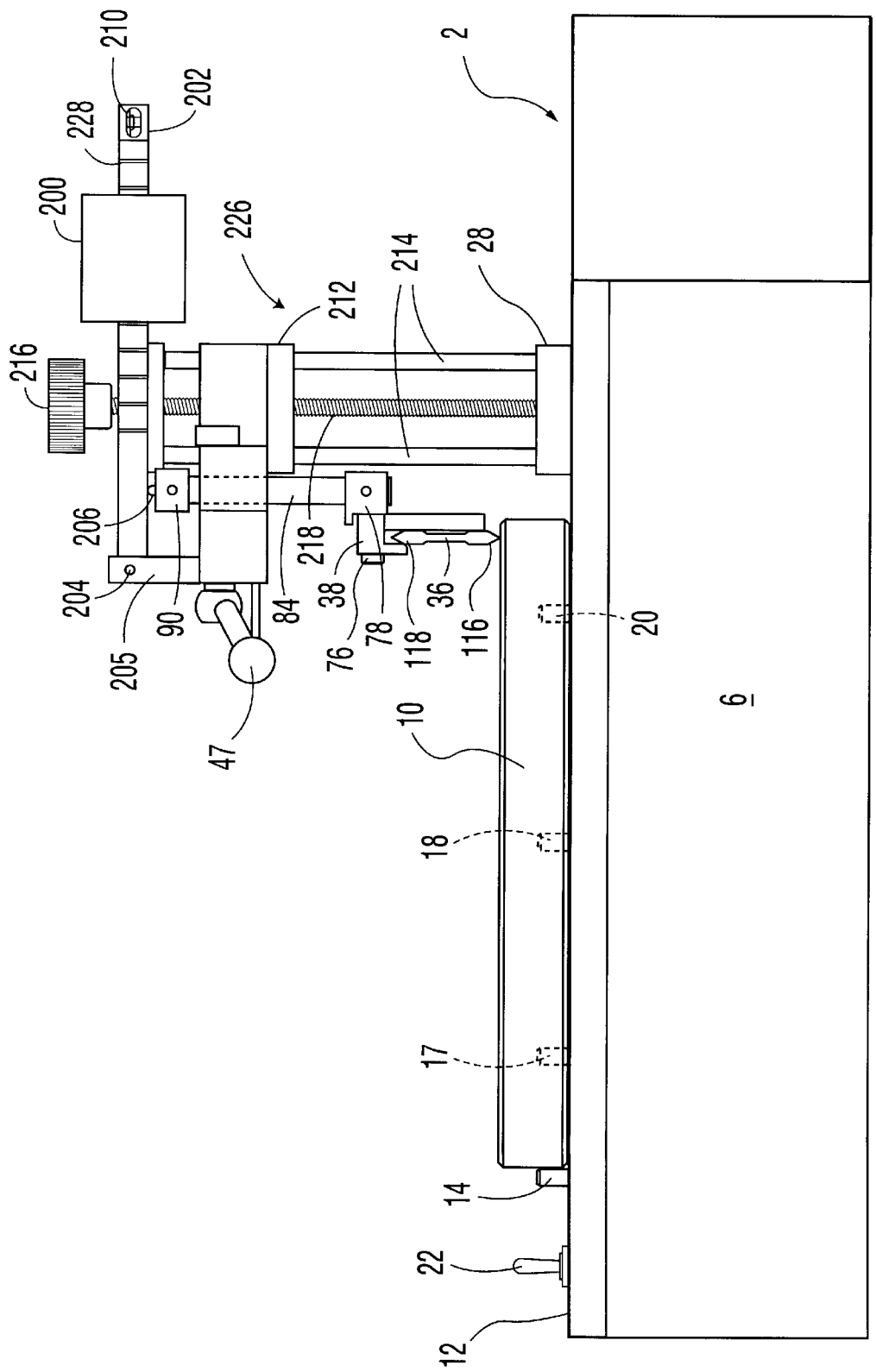
FIG. 15 is a front elevational view of a third embodiment of the invention.
Figure 16:
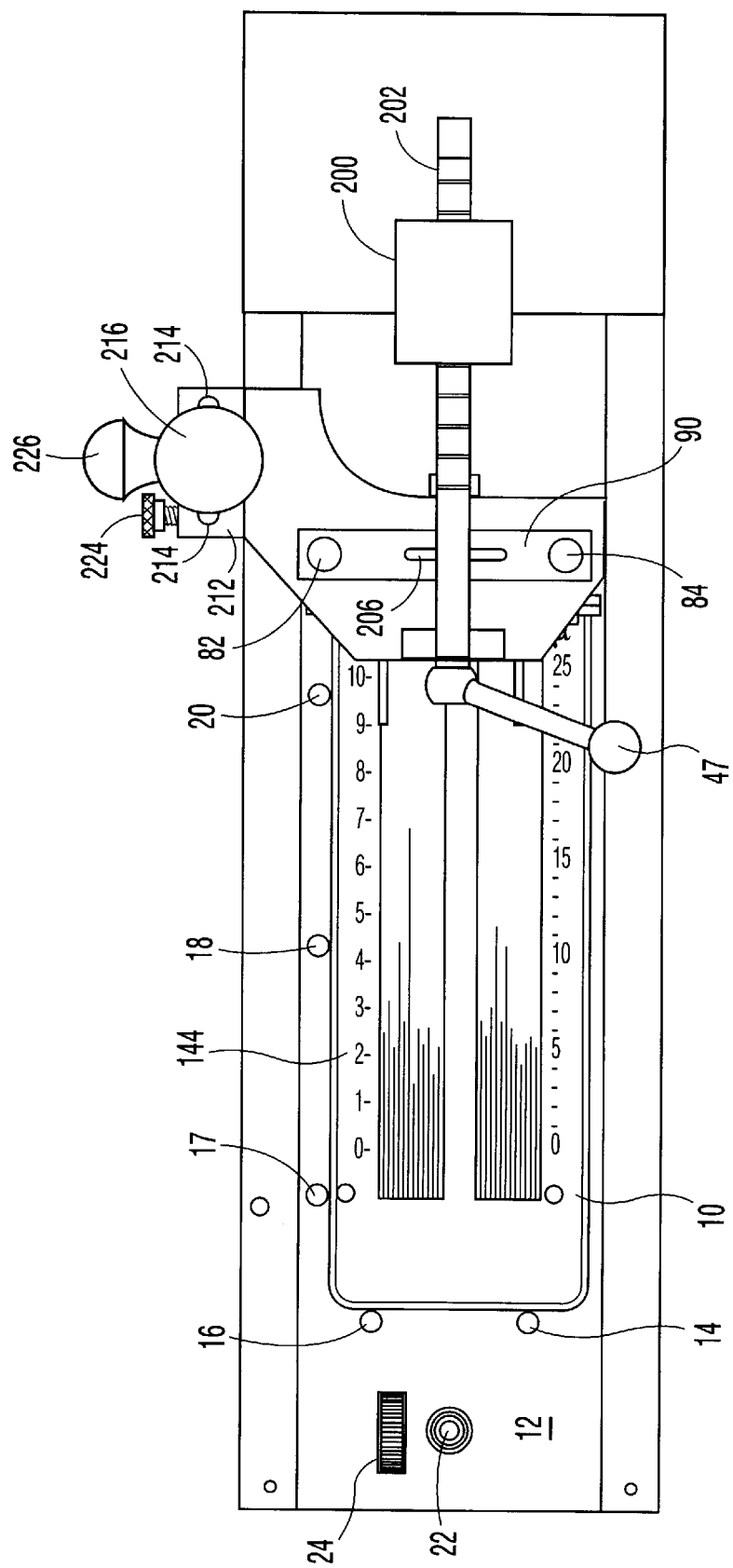
FIG. 16 is a top plan view of the third embodiment of the invention of FIG. 13.
Figure 17:
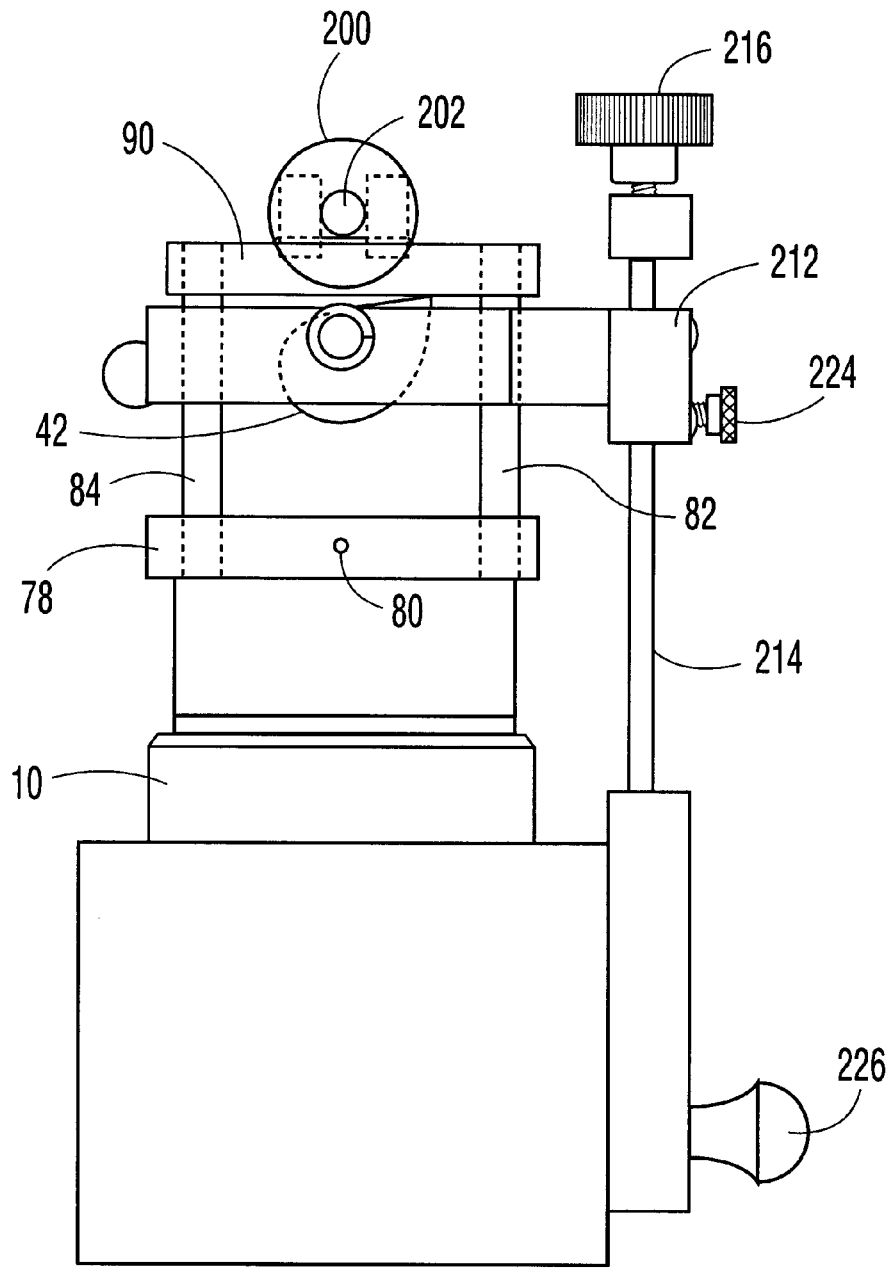
FIG. 17 is a right-side elevational view of the third embodiment of FIG. 15.
Figure 18:
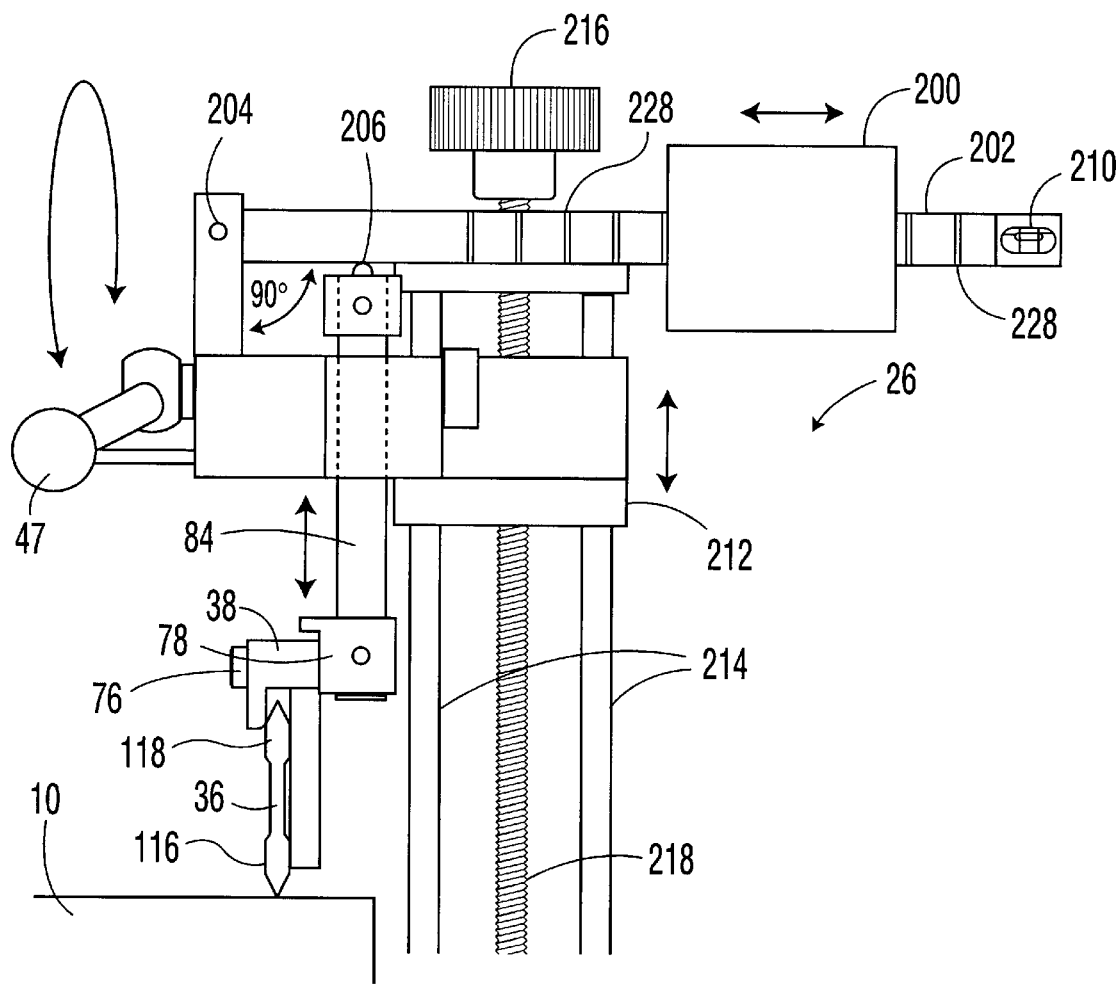
FIG. 18 is an enlarged view showing various elements in detail of the third embodiment of the invention.

FIG. 14 shows a slightly different drive engagement in which a half Acme™ nut 164' nearly fills the trough 162 between the drive shaft 160 and the side wall 174, and a tension spring 178 is attached between the half nut 164' and a far side wall 180 of the extension 58'.

Figure 19:
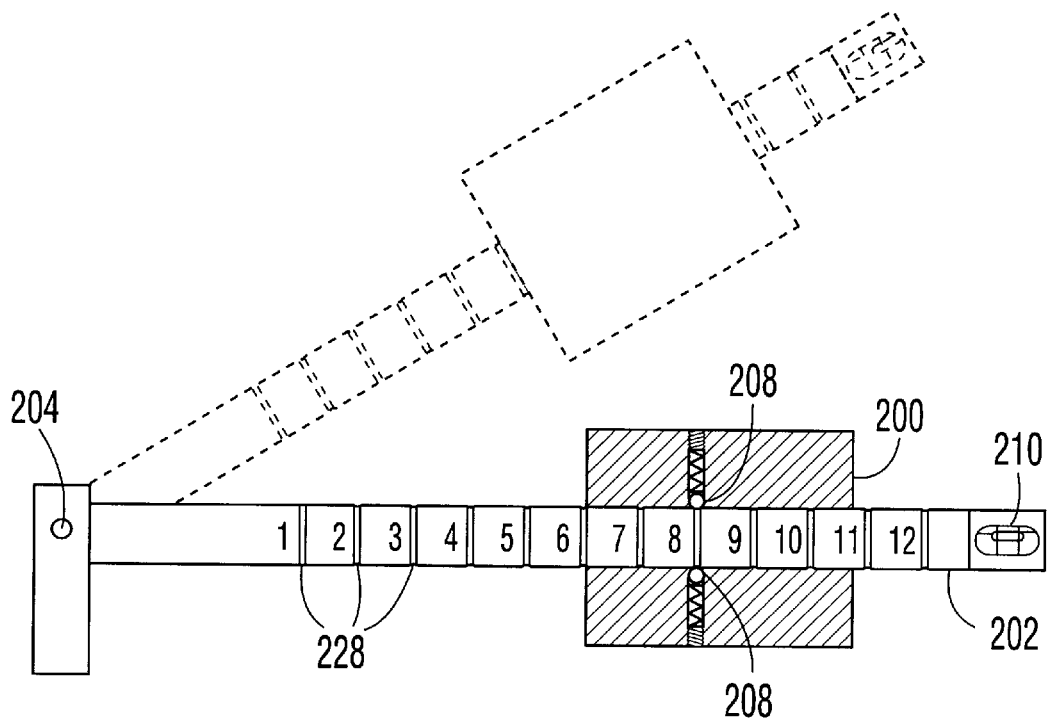
FIG. 19 is a detailed and enlarged view of a fulcrum and associated cylindrical weight mechanism for the third embodiment of the invention.

A third embodiment of the invention is shown in FIGS. 15 through 20. In this embodiment, a cylindrical weight 200 with a centrally located through hole is mounted on a lever 202. The weight 200 is selectively movable along a lever 202 which pivots at pin 204 and rests on dowel pin 206 that is the fulcrum point. The pin 204 retains an end of lever 202 in a U-shaped standoff or cradle 205. The dowel pin 206 rests in a groove on top of the bar 90. The force on the dowel pin 206 is transferred through bar 90, then through shafts 82 (see FIG. 17) and 84, and then through lower bar 78, then finally via scraper holder 38, to the scraper 36. As shown in the embodiment of FIG. 19, the lever 202 has grooves 228 in it such that a spring loaded ball 208 rests in and resiliently locks the weight 200 in a desired groove 228 to prevent the weight 200 from moving. The spring loaded ball 208 locks the weight weakly enough that it can be moved by hand when the operator wishes to change the force on the scraper 36. The grooves 228 are spaced such that each groove 228 corresponds to a one pound difference of force on the fulcrum relative to an adjacent groove 228. The grooves 228 are labeled as shown in FIG. 19, with the corresponding weight that each groove 228 represents. When properly adjusted the lever 202 should be horizontal. To facilitate this a level 210 is positioned on the end of the lever 202.

To properly setup the machine for use, the scraper 36 is placed in contact with grind gage 10. The weight 200 or 220 is positioned at the desired calibrated weight. Knob 216 is turned until lever 202 is horizontal according to level 210. Knob 224 is then tightened to lock block 212 at this position.

Figure 20:
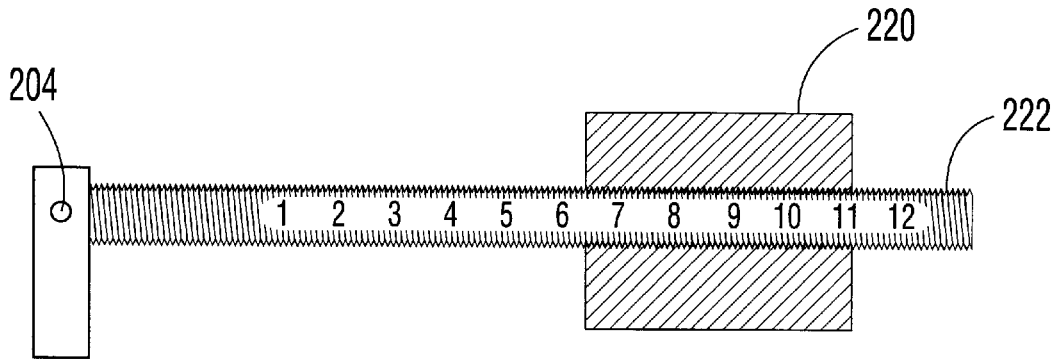
FIG. 20 shows a partial sectional and enlarged view of a fourth embodiment of the invention for providing an alternative fulcrum/weight mechanism compared to that of the embodiment of FIG. 19.

In another embodiment, as shown in FIG. 20, the weight 220 has a threaded hole that rides on a threaded lever 222 that is also threaded. The weight 220 must be spun to adjust its position along the lever 222. The lever 222 has a flat area where the corresponding force is marked along the length of the lever 222.

Note that in the third embodiment of the invention, relative to the previous embodiments, the carriage 226 has been modified. More specifically, shafts 214 replace vertical member 28. A block 212 has holes that the shafts 214 fit through and the block 212 slides up and down on. Also going through the block 212 is threaded shaft 218 that fits into a corresponding threaded hole in block 212. Knob 216 is affixed to threaded shafts 218 and as knob 216 is turned block 212 is raised or lowered. Knob 224 tightens against shafts 214 after block 212 is in the correct position. Also, a knob 226 is provided for permitting manual movement of the associated carriage mechanism.

Although various embodiments of the invention have been shown and described in detail, they are not meant to be limiting. Those of skill in the art may recognize certain modifications to these embodiments, which modifications are meant to be covered by the spirit and scope of the appended claims.

What is claimed is:

1. A machine for performing a draw-down operation comprising:
    a base having a top;
    a carriage mounted for movement along said base;
    an electric motor;
    means for coupling said electric motor to said carriage so as to move it along said base;
    a bracket mounted on said carriage so as to extend over said base;
    a holder for a scraper;
    a support assembly for attaching said holder to said bracket, and
    means for adjusting said bracket so as to vary the distance between it and said base.

2. A machine as set forth in claim 1, further comprising:
    means for varying the speed at which said carriage moves along said base.

3. A machine as set forth in claim 2, wherein said means for varying the speed at which the carriage moves along said base is a motor speed control.

4. A machine as set forth in claim 1, wherein said support assembly is such as to permit a scraper attached thereto to freely rotate about a point in a plane perpendicular to the top of said base.

5. The machine of claim 1, further including:
    a gage rod having one end pivotally mounted upon said bracket, and another end;
    a weight movable mounted on said gage rod; and
    fulcrum means including said gage rod and weight, and mounted on said bracket, for transferring a desired force from said weight to said scraper, whereby the force applied to said scraper is selectively controlled by positioning of said weight on said gage rod.

6. The machine of claim 5, wherein said gage rod is calibrated in units of force to be applied to said scraper at different positions on said gage rod.

7. A machine for performing a draw-down operation comprising:
    a base having a top;
    a carriage having a vertical member and an horizontal extension;
    a pair of rods mounted in parallel in said base and under said top, said rods
    extending through said horizontal extension in sliding relationship;
    an electric motor;
    means for coupling said motor to said horizontal extension so as to move said carriage parallel to said pair of rods;
    a bracket mounted on said vertical member so as to extend over the top of said base;
    means for adjusting the vertical position of said bracket on said vertical member;
    a first bar above said bracket;
    a second bar below said bracket;
    first and second parallel rods extending between said first and second bars and passing through said bracket in a sliding relation therewith;
    a cam mounted on said bracket that is rotatable to make contact with said first bar;
    coiled compression springs respectively coaxial with said first and second rods and between said second bar and said bracket; and
    means on said second bar to which a scraper holder may be attached.

8. A machine as set forth in claim 7, wherein said means for attaching a scraper holder to said second bar is such as to allow said scraper holder to rotate in a plane perpendicular to the top of said base.

9. A machine as set forth in claim 7, further comprising:
    a scraper holder attached to said last stated means; and
    said scraper holder having magnets for retaining a scraper.

10. A machine as set forth in claim 7, wherein said means for coupling said motor to said horizontal extension includes a belt.

11. A machine as set forth in claim 7, wherein said means for coupling said motor to said horizontal extension includes an Acme™ drive shaft.

12. A machine as set forth in claim 11, further comprising:
    a drive engagement mechanism for coupling said horizontal extension and said drive shaft.

13. A machine for performing a draw-down operation comprising:
    a base having a top;
    a carriage having a vertical member and an horizontal extension;
    a pair of rods mounted in parallel in said base and under said top, said rods extending through said horizontal extension in sliding relationship;
    an electric motor;

means for coupling said motor to said horizontal extension so as to move said carriage parallel to said pair of rods;

a bracket mounted on said vertical member so as to have a bottom portion extend over the top of said base;

means for adjusting the vertical position of said bracket on said vertical member;

means for attaching a scraper holder onto the bottom portion of said bracket;

a gage rod having one end pivotally mounted upon said bracket, and another end;

a weight movable mounted on said gage rod; and fulcrum means including said gage rod and weight, and mounted on said bracket, for transferring a desired force from said weight to said scraper, whereby the force applied to said scraper is selectively controlled by positioning of said weight on said gage rod.

14. The machine of claim 13, wherein said gage rod is calibrated in units of force to be applied to said scraper at different positions on said gage rod.

* * * * *